United States Patent [19]
Coleman

[11] Patent Number: 5,067,644
[45] Date of Patent: Nov. 26, 1991

[54] RACK PROTECTIVE DEVICE

[76] Inventor: Robert A. Coleman, 19612 Grandview Dr., Topanga, Calif. 90290

[21] Appl. No.: 586,431
[22] Filed: Sep. 21, 1990
[51] Int. Cl.⁵ .............................................. B60R 9/00
[52] U.S. Cl. .................................. 224/324; 224/319; 224/309; 224/318; 224/917
[58] Field of Search ............... 224/324, 318, 317, 319, 224/309, 917

[56] References Cited

U.S. PATENT DOCUMENTS

| | | | |
|---|---|---|---|
| 3,902,641 | 9/1975 | Pesley | 224/318 |
| 4,326,655 | 4/1982 | Gradek et al. | 224/324 |
| 4,694,774 | 9/1987 | Keithley | 296/100 |
| 4,793,535 | 12/1988 | Johnson | 224/328 |
| 4,957,400 | 9/1990 | Karp | 224/309 |

FOREIGN PATENT DOCUMENTS 3135765  3/1982  Fed. Rep. of Germany ...... 224/318
1211249  3/1960  France ................. 224/318

Primary Examiner—Linda J. Sholl
Attorney, Agent, or Firm—Andra M. Finkel

[57] ABSTRACT

The present invention comprises a guard for racks that are used on cars and the like which comprise one or more elongated members comprised of a dense protective material such as styrofoam or foam rubber of a suitable thickness to ensure that the object to be placed on the rack will be protected. Each of the substantially elongated members comprises an upper outer surface with a recessed substantially concave inner surface capable of receiving and covering the horizontal bars of the guard. Attached to each end of the elongated member are attachment means for fastening the elongated member to the rack and which are also used to fasten one or more objects to the rack. Alternatively, objects may be attached to the guard through specifically configured straps for items such as skis, surfboards and the like.

7 Claims, 2 Drawing Sheets

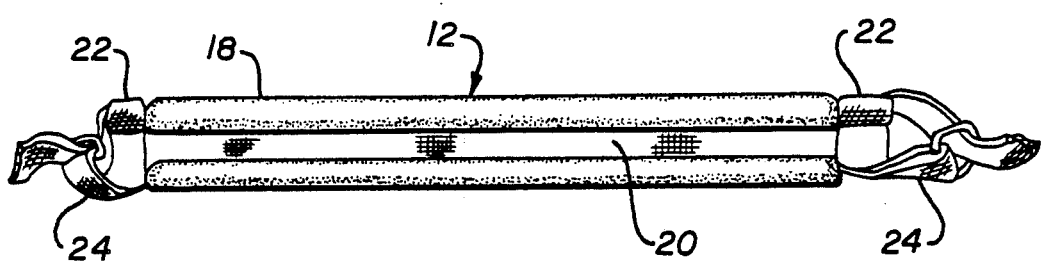
FIG. 4
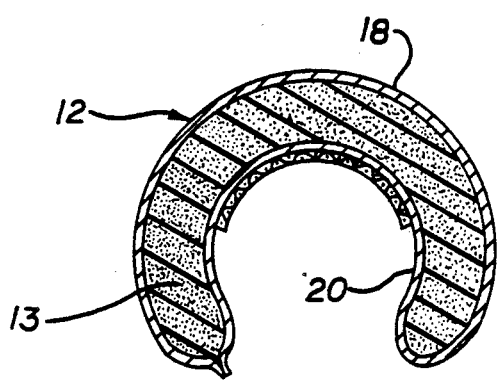
FIG. 5
FIG. 6
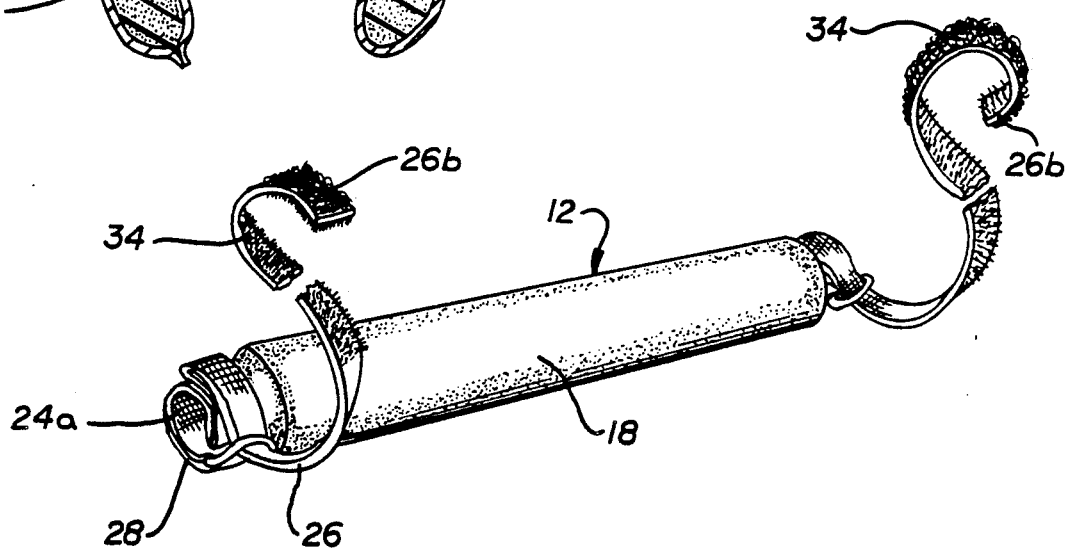
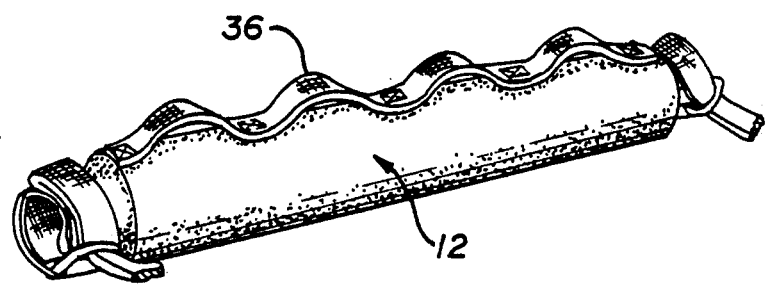
FIG. 7

RACK PROTECTIVE DEVICE

BACKGROUND OF THE INVENTION

1. Field of the Invention

The present invention relates to the field of protection devices for car racks and the like which are used to protect objects from being scratched by the rack.

2. Prior Art

Various devices are known in the art whereby foam is used to act as a buffer between one object and another. However, none of these devices are specifically configured for car racks. The devices that do exist are cumbersome and comprise many pieces. Specifically, they are complicated to affix to the car and the object. The present invention fulfills a long felt need for a simple and easy to use device to provide protection for objects to be placed on car racks.

SUMMARY OF THE INVENTION

The novel device of the present invention comprises a first elongated member of a suitable size to universally fit substantially the length of the horizontal members of most car racks and the like. The first elongated member has an upper surface and an inner surface. The inner surface is recessed within the upper surface so as to provide an area for receiving the horizontal bar. In the preferred embodiment, the elongated member resembles an elongated letter "C." Specifically, the first member has an upper side and a bottom side which are separated by a dense material such as styrofoam, foam rubber and the like. The bottom side has a concave recessed aperture. The first member has a first and second end to which attachment means are affixed. The attachment means comprise two complementary straps which have a first end permanently affixed to the elongated member. One strap has a fastening device, such as a "D" ring, Velcro, a clip, or the like, for receiving and tightening the second strap around the horizontal bar. In this manner, the elongated member is attached to the car rack. The second strap is used to secure the object to the guard and rack, and thus is longer than the first strap. Additionally, in the preferred embodiment, the second strap has a fastening device, such as a "D" ring, Velcro, a clip, or the like, proximate the first and second ends of the elongated member.

In an alternative embodiment, there is a second fastening means affixed to the upper side of the elongated member, configured so as to secure specific objects such as skis, ski poles, surfboards, and the like to the protection device.

The present invention is used by slipping the recessed portion of each elongated member over each horizontal bar of a rack so that an object may be placed across the upper outer surfaces of the guards, fastening each end of each guard to the horizontal member using the attachment means and then securing the object to the guards with either the exposed ends of the second straps of the attachment means or using the specially configured straps.

BRIEF DESCRIPTION OF THE DRAWINGS

FIG. 4 is a bottom plan view of the device of the present invention.

FIG. 5 is a cross sectional view taken along lines 5—5 of FIG. 2.

FIG. 6 is a perspective view of the first alternative embodiment of the present invention.

FIG. 7 is a perspective view of the second alternative embodiment of the present invention.

DESCRIPTION OF THE PREFERRED EMBODIMENT

Figure 1:
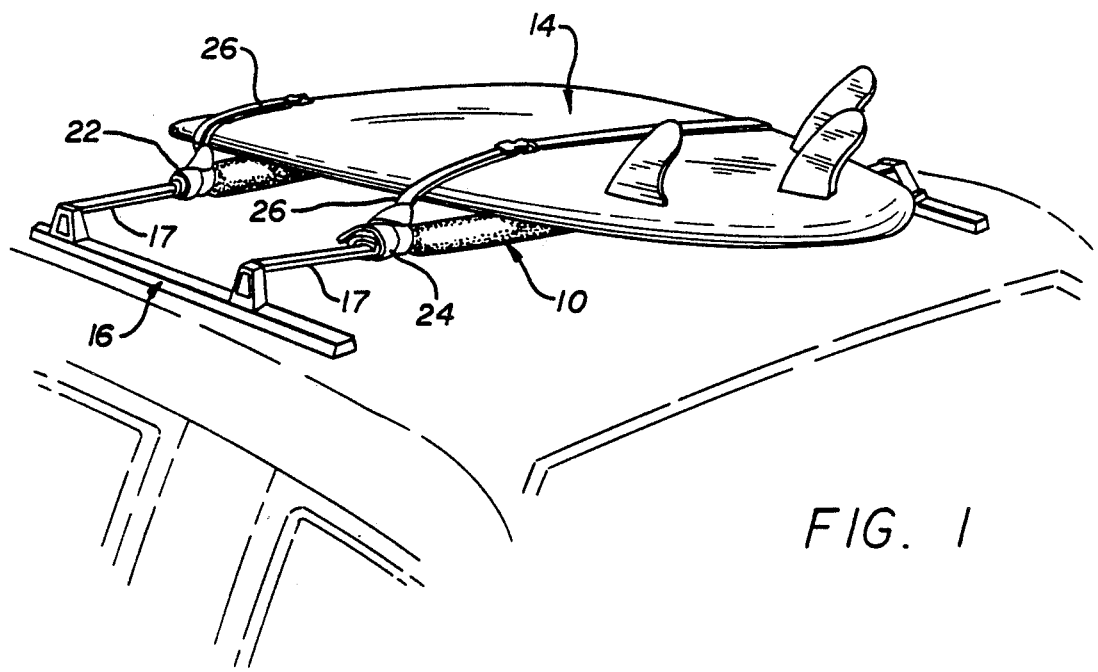
FIG. 1 is a perspective view of the device of the present invention as used on a car rack to which an object has been fastened.
Figure 2:
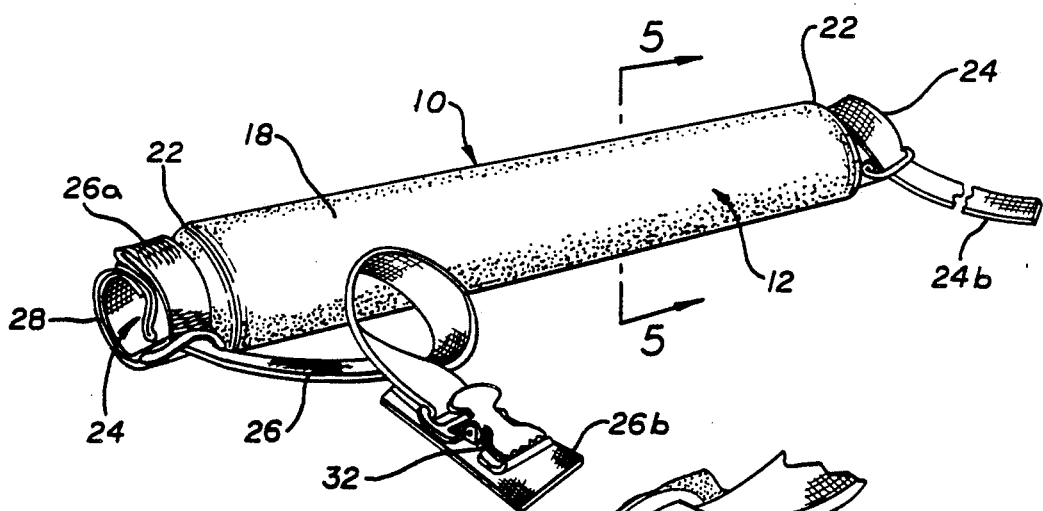
FIG. 2 is a perspective view of the first embodiment of the present invention.
Figure 3:
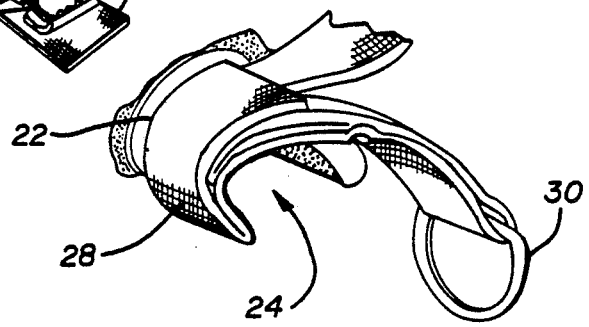
FIG. 3 is a fragmentary perspective view of an end of FIG. 2.

With reference to the drawings and particularly to FIGS. 1-5, the protection device 10 of the present invention comprise one or more elongated members 12 comprised of a dense protective material 13 such as styrofoam or foam rubber of a suitable thickness to ensure that the object 14 to be placed on a rack 16 will be protected. Each of the elongated members 12 comprise an upper outer surface 18 with a recessed substantially concave inner surface 20 capable of receiving and covering substantially the entire length of the horizontal bars 17 of the rack. A suitable material such as polyester, ducking, and the like which are capable of withstanding temperature changes, inclement weather and the like, while also protecting the object 14 from being scratched, covers the entire surface of the elongated members 12. Attached to each end 22 of the elongated member 12 are attachment means 24 for fastening the elongated member 12 to the rack 16 and which are also used to fasten one or more objects 14 to the rack. Attachment means 24 comprise a first elongated strap 26 of sufficient length to span the distance across the rack bar 17 and also secure an object 14 thereto. The first end 26a of the elongated strap is secured by either stitching or gluing to the end 22 of the elongated member 12. The second end 26b of the elongated strap may have a means for fastening it to the complementary strap affixed to the other end of the elongated member. In the preferred embodiment shown in FIG. 2, there is a clip capable of receiving the end of the complementary strap on the other end. In the first alternative embodiment shown in FIG. 6, strap end 26b has Velcro 34 on the upper and lower portions thereof. Alternatively, there may be no fastening device and the object may be secured through the use of a knot.

Fastening means 24 also comprises a second strap 28 sewn or glued at each end to the end of the elongated member 12 having a "D" ring 30 substantially in the middle thereof, through which the first strap 26 is passed in order to secure the device 10 to the horizontal bar 17 of the Car rack 16.

In a second alternative embodiment, strap 36 is affixed to the upper surface 18 of the elongated member 12 which is specifically configured so as to receive items such as skis, surfboards and the like.

The present invention is used by slipping the recessed portion 20 of each elongated member 12 over each horizontal bar 17 of a rack 16 so that an object 14 may be placed across the upper outer surfaces 18 of the guards 10. Then first strap 26 of the fastening means 24 is slipped around bar 17 and pulled tightly through "D" ring 30, fastening each end of each guard to the horizontal bar 17. The object 14 is placed on top of the outer surface 18 of the device and then strap 24b is tightly connected through clip 32 in FIG. 2 or by the Velcro 34 in FIG. 7 so that the object will not move while it is in transit.

While particular embodiments of the invention have been shown and illustrated herein, it will be understood that many changes, substitutions and modifications may be made by those persons skilled in the art. It will be appreciated from the above description of presently preferred embodiments that other configurations are possible and within the scope of the present invention. Thus, the present invention is not intended to be limited to the particular embodiments specifically discussed hereinabove.

What is claimed is:

1. A device for protecting items that are placed atop first and second horizontal members of any vehicle rack, comprising:
    a first elongated member comprised of a dense protective material of a sufficient thickness to ensure that the item to be placed on the rack will be protected, said first elongated member having a first and a second end and an upper surface and a lower surface, said lower surface having a recessed substantially C-shaped concave aperture therein capable of receiving and fitting totally around and over the length of the first horizontal bar member;
    a second elongated member comprised of a dense protective material of a sufficient thickness to ensure that the item to be placed on the rack will be protected, said second elongated member having a first and a second end and an upper surface and a lower surface, said lower surface having a recessed substantially C-shaped concave aperture therein capable of receiving and fitting totally around and over the length of the second horizontal bar member of the rack;
    a first strap having a first and a second end, said first end of said first strap being permanently affixed to said first end of said first elongated member for rigidly affixing the first elongated member to the first horizontal bar, and having first means for connecting the attached to said second end of said first strap;
    a second strap having a first and a second end, said first end of said second strap being permanently affixed to said second end of said first elongated member for rigidly attaching the first elongated member to the first horizontal bar, and having second means for connecting attached to said second end of said second strap, said second connecting means capable of receiving said first connecting means, whereby the first end of an item to be protected will be rigidly affixed to the upper surface of the first elongated member;
    a third strap having a first and a second end, said first end of said third strap being permanently affixed to said first end of said second elongated member for rigidly affixing the second elongated member to the second horizontal bar, and having third means for connecting attached to said second end of said third strap;
    a fourth strap having a first and a second end, said first end of said fourth strap being permanently affixed to said second end of said second elongated member for rigidly attaching the second elongated member to the second horizontal bar, and having fourth means for connecting attached to said second end of said fourth strap, said fourth connecting means cable of receiving said third connecting means, whereby the second end of an item to be protected will be rigidly affixed to the upper surface of the second elongated member.

2. The device of claim 1 whereby said first and second elongated members are identical.

3. The device of claim 1 further comprising a fifth means for connecting permanently affixed to the upper surface of said first and second elongated members, said fifth connecting means shaped to receive skis and poles.

4. The device of claim 1 further comprising a fifth means for connecting permanently affixed to the upper surface of said first and second elongated members, said fifth connecting means shaped to receive a surfboard.

5. The device of claim 1 further comprising a fifth means for connecting permanently affixed to the upper surface of said first and second elongated members, said fifth connecting means shaped to receive water skis.

6. The device of claim 1, wherein the first and third connecting means are identical and comprise D-rings.

7. The device of claim 1, wherein the first and third connecting means are identical and comprise Velcro extending along an upper surface thereof and said second and fourth connecting means are identical and comprise Velcro extending along the lower surface thereof.

* * * * *